US011941373B2

(12) United States Patent
Deng et al.

(10) Patent No.: US 11,941,373 B2
(45) Date of Patent: Mar. 26, 2024

(54) CODE GENERATION THROUGH REINFORCEMENT LEARNING USING CODE-QUALITY REWARDS

(71) Applicant: MICROSOFT TECHNOLOGY LICENSING, LLC., Redmond, WA (US)

(72) Inventors: Shao Kun Deng, New York City, NY (US); Neelakantan Sundaresan, Bellevue, WA (US); Alexey Svyatkovskiy, Bellevue, WA (US); Michele Tufano, Bellevue, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 154 days.

(21) Appl. No.: 17/555,263

(22) Filed: Dec. 17, 2021

(65) Prior Publication Data
US 2023/0195428 A1 Jun. 22, 2023

(51) Int. Cl.
*G06F 8/33* (2018.01)
*G06F 18/21* (2023.01)
*G06N 3/04* (2023.01)

(52) U.S. Cl.
CPC .............. *G06F 8/33* (2013.01); *G06F 18/217* (2023.01); *G06N 3/04* (2013.01)

(58) Field of Classification Search
CPC ............ G06N 3/04; G06F 8/33; G06F 18/217
See application file for complete search history.

(56) References Cited

U.S. PATENT DOCUMENTS

| 2020/0005168 | A1  |  1/2020 | Bhargava et al. |
| 2020/0387827 | A1* | 12/2020 | Stassen ................. G06N 3/044 |
| 2021/0073995 | A1  |  3/2021 | Yang et al. |
| 2021/0192140 | A1  |  6/2021 | Galley et al. |
| 2021/0240453 | A1* |  8/2021 | Badlani ..................... G06F 8/42 |
| 2021/0374338 | A1* | 12/2021 | Shrivastava ............ G06F 40/30 |
| 2022/0335270 | A1* | 10/2022 | Ma ........................ G06N 3/088 |
| 2022/0382541 | A1* | 12/2022 | Ren ........................... G06F 8/71 |
| 2022/0398074 | A1* | 12/2022 | Dolby ....................... G06F 8/35 |
| 2022/0405682 | A1* | 12/2022 | Yoon ........................ G06N 3/04 |
| 2023/0080002 | A1* |  3/2023 | Angilella ............... G07C 5/006 73/117.03 |
| 2023/0115217 | A1* |  4/2023 | Mane .................. G06F 9/45558 717/148 |

(Continued)

OTHER PUBLICATIONS

Raymond Tiwang, A Deep Learning Model for Source Code Generation, Apr. 14, 2019, IEEE (Year: 2019).*

(Continued)

*Primary Examiner* — Wei Y Zhen
*Assistant Examiner* — Amir Soltanzadeh (57) ABSTRACT

A deep learning model trained to learn to predict source code is tuned for a target source code generation task through reinforcement learning using a reward score that considers the quality of the source code predicted during the tuning process. The reward score is adjusted to consider code-quality factors and source code metrics. The code-quality factors account for the predicted source code having syntactic correctness, successful compilation, successful execution, successful invocation, readability, functional correctness, and coverage. The source code metrics generate a score based on how close the predicted source code is to a ground truth code.

20 Claims, 5 Drawing Sheets

(56) References Cited

U.S. PATENT DOCUMENTS

| | | | | |
|---|---|---|---|---|
| 2023/0176847 A1* | 6/2023 | Ben-Moshe | ......... | G06T 15/005 717/168 |
| 2023/0211493 A1* | 7/2023 | Cristache | ................ | B25J 9/162 700/245 |

OTHER PUBLICATIONS

"Welcome to Transformer Reinforcement Learning (trl)", Retrieved from: https://web.archive.org/web/20201204142717/https://github.com/lvwerra/trl, Dec. 4, 2020, 5 Pages.

Abdolrashidi, et al., "Learning to Fuse", In Proceedings of 33rd Conference on Neural Information Processing Systems, Dec. 2019, 6 Pages.

Tufano, et al., "Unit Test Case Generation with Transformers and Focal Context", In Repository of arXiv:2009.05617v2, May 20, 2021, pp. 1-15.

Xiao, Liu, "Neural Program Synthesis for Compiler Fuzzing", In the Dissertation Submitted to Graduate School for the Doctorate Degree of Philosophy in Information Sciences and Technology, Nov. 15, 2019, 135 Pages.

Ziegler, et al., "Fine-Tuning Language Models from Human Preferences", In Repository of arXiv:1909.08593v2, Jan. 8, 2020, 26 Pages.

"GitHub—lvwerra/trl: Train transformer language models with reinforcement learning", Retrieved From: https://web.archive.org/web/20201204170810/https://github.com/lvwerra/trl, Dec. 4, 2020, 6 Pages.

"International Search Report and Written Opinion Issued in PCT Application No. PCT/US22/044466", dated Jan. 16, 2023, 10 Pages.

Wang, et al., "CodeT5: Identifier-aware Unified Pre-trained Encoder-Decoder Models for Code Understanding and Generation", In Repository of arXiv:2109.00859v1, Sep. 2, 2021, 13 Pages.

Mnih, et al., "Asynchronous Methods for Deep Reinforcement Learning", In Repository of arXiv:1602.01783v2, Jun. 16, 2016, 19 Pages.

Schulman, et al., "High-Dimensional Continuous Control Using Generalized Advantage Estimation", In Repository of arXiv:1506.02438v6, Oct. 20, 2018, pp. 1-14.

Schulman, et al., "Proximal Policy Optimization Algorithms", In Repository of arXiv:1707.06347v2, Aug. 28, 2017, pp. 1-12.

Tang, et al., "Implementing Action Mask in Proximal Policy Optimization (PPO) Algorithm", In Journal of ICT Express, vol. 6, Issue 3, May 20, 2020, pp. 200-203.

Zhang, et al., "Proximal Policy Optimization via Enhanced Exploration Efficiency", In Repository of arXiv:2011.05525v1, Nov. 11, 2020, pp. 1-34.

* cited by examiner

CODE GENERATION THROUGH REINFORCEMENT LEARNING USING CODE-QUALITY REWARDS

BACKGROUND

A deep learning model, trained to learn to predict source code is tuned for a target source code generation task through reinforcement learning using a reward score that considers the quality of the source code predicted during the tuning process. The reward score is adjusted to consider code-quality factors and source code metrics. The code-quality factors account for the predicted source code having syntactic correctness, successful compilation, successful execution, successful invocation, readability, functional correctness, and coverage. The source code metrics generate a score based on how close the predicted source code is to a ground truth code.

Large neural transformer models have been used to perform various tasks in speech recognition, optical character recognition, text-to-speech translation, and question-answer generation. These models are trained on large volumes of data using classic loss functions, such as cross-entropy loss, which utilize a maximum likelihood objective that minimizes the loss. However, the training of a deep learning model based on classic loss functions does not capture the quality of the predicted output. Often the predicted output is subject to exposure bias as a result of the techniques used during training of generative language models. There is often a mismatch between the training and inference settings, since at inference time, the model uses the previously-generated words from the model distribution to predict the next word, while at training time, the model is conditioned on the previous ground truth tokens. This may result in the predicted output being less useful for its intended task.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A deep learning model, trained to predict source code, is tuned for a target source code generation task through reinforcement learning using a reward score that considers the quality of the source code predicted during the tuning process. The reward score is adjusted to consider code-quality factors and source code metrics of the predicted source code. The code-quality factors account for the predicted source code adhering to a set of quality factors, such as syntactic correctness, successful compilation, successful execution, successful invocation, functional correctness, the readability of the source code, and whether the predicted source code covers the intended task. The reward score is used to generate a policy loss that is used to tune the parameters of the model to take actions that account for the quality aspects of the predicted source code.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

Aspects disclosed herein relate to tuning a deep learning model to learn to predict source code for a target source code generation task through reinforcement learning using a reward score that considers the quality of the source code predicted by the model. The reward score uses code-quality factors and source code metrics to determine the quality of the model-generated source code. Quality-generated source code predicted by the model during training is given a high reward. The reward score is used in a proximal policy optimization process to adjust the parameters of the model to learn the actions that produce better quality source code.

Classic loss functions, such as cross-entropy loss, simply compare a predicted code snippet to its ground truth target source code missing the nuances of code generation. Instead, code-quality factors and source code metrics can generate a score based on multiple code qualities, providing a more accurate way to evaluate a code prediction. For example, a predicted source code snippet could be completely different from the target source code, in terms of token-by-token comparison, as evaluated by cross-entropy loss, but still being a correct and equivalent prediction for the code generation task at hand.

The code-quality factors include syntactic correctness, successful compilation, successful execution, successful invocation, functional correctness in terms of passing tests executions, test coverage, if the output is a test case, readability, and coverage. The n-gram based source code metrics include BLEU and ROGUE metrics that score the predicted source code with its ground truth code. By considering the source code-quality measurements and metrics in tuning the model, the model learns the semantic nature of the target source code generation task in addition to the syntactic structure of source code in order to better determine the actions to take in making a prediction.

Reinforcement learning is a technique that uses a system of rewards and penalties to train a deep learning model to learn to solve a problem by itself. Reinforcement learning differs from supervised learning and unsupervised learning. In supervised learning, a model learns from a training dataset of labeled examples. Each sample in the training dataset contains a correct action that the model should take. The model learns to generalize its actions in order to act in situations not present in the training dataset. In unsupervised learning, the model learns to find patterns or structure hidden in the training dataset of unlabeled data. By contrast, reinforcement learning maximizes a reward gradually observed on its outputs during its training instead of trying to find hidden patterns and structure in the unlabeled training dataset.

The reward-based learning method differs from traditional training methods that optimize a maximum-likelihood loss or cost function (e.g., cross entropy loss). Instead, the reward-based learning method maximizes a specific, potentially discrete, non-differentiable reward instead of optimizing a maximum-likelihood loss function. The reward tells the neural network which action is wrong and which action is correct in order to learn to take actions that generate better quality source code.

In reinforcement learning, an actor interacts over time with its environment to achieve a goal and learns the actions that produce the most reward by trying them. The actor (e.g., deep learning model being tuned) observes the current state of the environment to decide which action to take (e.g., prediction of next token in a candidate source code sequence). The environment changes state and produces a reward for that action. The reward indicates whether the action was good or bad using the source code-quality measurements and metrics. A higher reward is given for an action that produces quality-generated source code. A penalty is imposed when the action is bad. The cycle of observation, action, and reward is repeated until the learning is complete.

The actor uses a function or policy that maps the inputs into the actions or outputs. The environment uses the reward as feedback on the action. The goal of the tuning phase is for the model to learn the optimal policy that maps a large set of observations into a set of actions that control the environment.

Proximal policy optimization is a reinforcement learning technique that optimizes a surrogate objective function for performing stochastic gradient descent. A surrogate objective is one that approximates another objective or function. Surrogate optimization is used for time-consuming objective functions by taking a few evaluations in order to generate a good solution readily. This is also beneficial when there is limited tuning data for a target task.

In PPO, a policy gradient is computed to tune the parameters of the deep learning model. The goal of PPO is to limit large policy updates during tuning in order to avoid degrading the policy. In one aspect, the policy gradient is computed as a function of a clipped surrogate objective and a value function error term. The clipped surrogate objective minimizes the gradient to a lower bound so that the gradient updates are small. The value function is used by the model to estimate the reward for its own predictions. The value function error term is used to improve the estimation of value function, such that it can more accurately estimate the rewards for its predictions and, in turn, the model can generate predictions that maximize such reward.

In PPO, two interactive actors or deep learning models are trained with each model based on a different policy. A policy is a probability distribution of the actions $a_t$ given a state $s_t$ at time step t that an actor models. Model-O is a deep learning model trained with a set of parameters $\vartheta_{OLD}$ and policy π to generate source code given an input. Model-RL is a deep learning model trained with a set of parameters $\vartheta_{NEW}$ and policy ρ that is tuned to generate source code for a specific source code generation task. Model-RL uses the parameters of Model-O initially which are then updated through PPO using a tuning dataset of samples of the specific source code generation task.

In one aspect, the deep learning model is a neural transformer model with attention. Deep learning models differ from traditional machine learning models. Machine learning pertains to the use and development of computer systems that are able to learn and adapt without following explicit instructions, by using algorithms and statistical models to analyze and draw inferences from patterns in data. Machine learning uses different types of statistical methods to learn from data and to predict future decisions. Traditional machine learning includes classification models, data mining, Bayesian networks, Markov models, clustering, support vector machines, and visual data mapping. Deep learning differs from traditional machine learning since it uses multiple stages of data processing through many hidden layers of a neural network to learn and interpret the features and the relationships between the features. Deep learning embodies neural networks which differs from the traditional machine learning techniques that do not use neural networks.

A neural transformer model with attention is one type of deep learning that utilizes an attention mechanism. Attention directs the neural network to focus on a subset of features or tokens in an input sequence thereby learning different representations from the different positions of the tokens in an input sequence. The attention mechanism provides the model with a better capability to learn the task at hand thereby generating more accurate predictions. It should be noted that the term neural transformer model with attention and neural transformer model are used interchangeably.

There are different configurations of a neural transformer model. In one aspect, the techniques are applied to a decoder-only configuration of a neural transformer model. The decoder-only neural transformer model is an auto-regressive model that produces an output one element at a time based on the outputs of previous time steps. Code generation is best suited for a decoder neural transformer model since it is an auto-regressive task that predicts an ordered sequence of tokens where the order depends on the preceding tokens in the sequence. The decoder uses a masked self-head attention which is best suited for auto-regressive tasks since it is explicitly trained to generate auto-regressively.

In one aspect, the techniques disclosed herein are discussed with regard to the generation of a unit test case (i.e., method body) given an input, such as a method body. However, it should be noted that this particular source code generation task is used to illustrate the disclosed techniques and should not be construed as limiting the technique to unit test case generation. The disclosed techniques may be applied to other source code generation tasks, such as code completion, docstring generation, method body generation, and the like.

Attention now turns to a more detailed description of the system, method, components, devices, used to train a deep learning model to generate or predict source code given a context.

System

Figure 1:
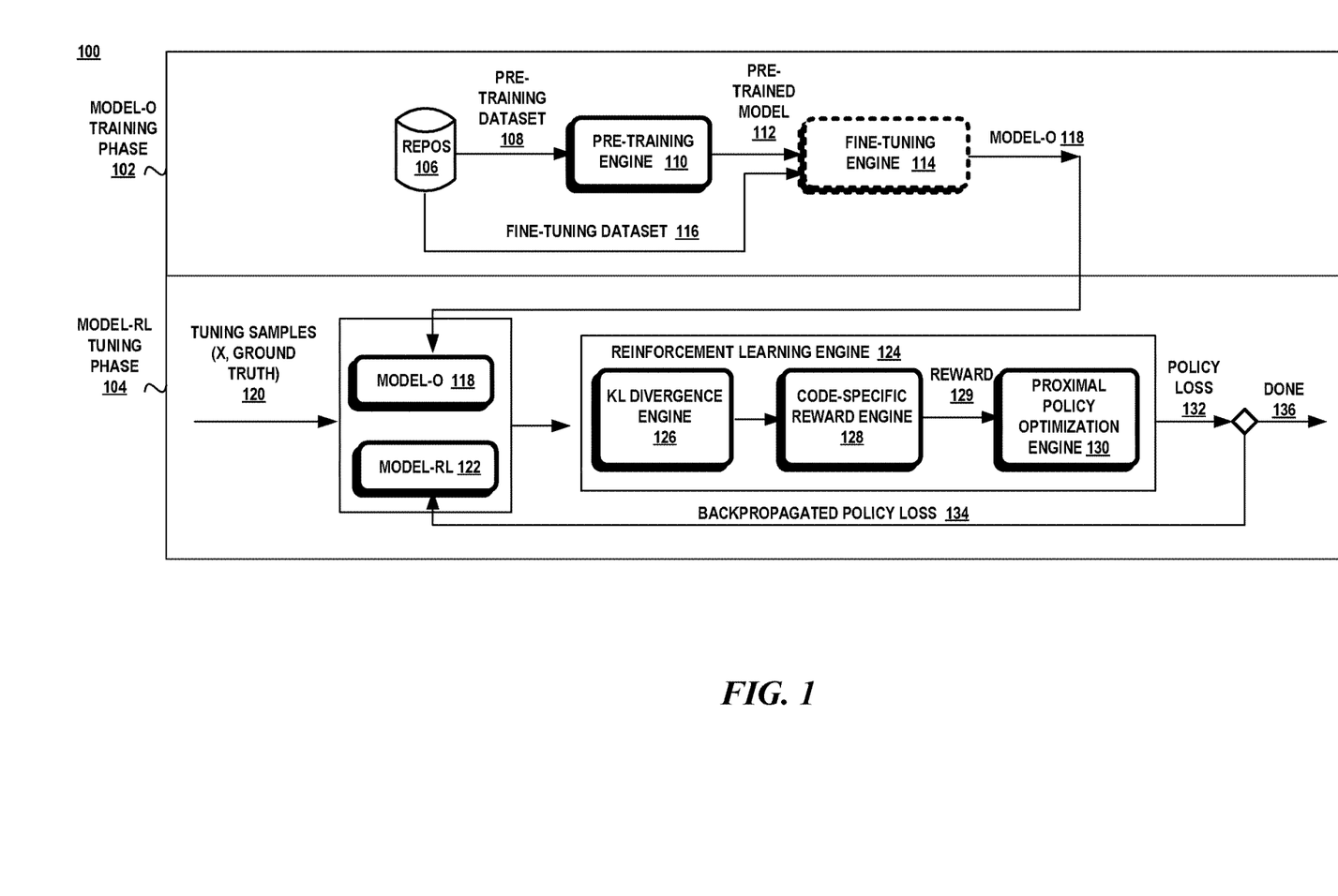
FIG. 1 illustrates an exemplary system for tuning a deep learning model using reinforcement learning with a code-quality reward.

FIG. 1 illustrates a block diagram of an exemplary system 100 in which various aspects of the invention may be practiced. As shown in FIG. 1, system 100 includes a Model-O training phase 102 and a Model-RL tuning phase 104. In the Model-O training phase 102, a pre-trained deep learning model is generated to learn to predict source code from a pre-training dataset 108. The original pre-trained model, Model-O 112, is then tuned through reinforcement learning for a particular source code generation task in the Model-RL tuning phase 104. In some aspect, the pre-trained model, Model-O 112, may already exist. In this case, there would be no need to train the model.

The model 112 may, optionally, be fine-tuned using a fine-tuning engine 114 for a downstream related task using a fine-tuning dataset 116. The fine-tuning engine 114 trains the model using a cross-entropy loss objective function. The fine-tuned model may then be tuned or optimized through reinforcement learning to produce an optimized model, Model-RL.

In the Model-O training phase 102, a deep learning model 118 is pre-trained by a pre-training engine 110 on a pre-training dataset 108. The pre-training dataset 108 includes a large corpus of source code programs written in a particular programming language from private and/or public source code repositories 106. The pre-training dataset 110 is used to train the model 116 to learn the syntactic structure of source code and the semantic relationships between the elements of these source code programs. The pre-training engine 110 trains the model using a cost function, such as cross-entropy loss.

In the Model-RL tuning phase 104, the model is tuned or optimized using reinforcement learning. Model-RL is initialized with the parameters of Model-O which are then updated in the Model-RL tuning phase 104. A set of tuning samples 120 is applied to both the original trained Model-T and the current state of Model-RL. The distributions output from each of these models is then analyzed by the reinforcement learning engine 124. The KL-divergence engine 126 computes the difference between the two output distributions as a reward for each predicted token and then adds a code-quality reward to the reward for the predicted source code based on a set of code-quality factors and a set of supervised metrics. The adjusted reward score 129 is then used by the PPO engine 130 to generate a policy loss that is backpropagated 134 to update the parameters of Model-RL 122.

Attention now turns to a discussion of the deep learning model.

Neural Transformer Model with Attention

Machine learning pertains to the use and development of computer systems that are able to learn and adapt without following explicit instructions by using algorithms and statistical models to analyze and draw inferences from patterns in data. Machine learning uses different types of statistical methods to learn from data and to predict future decisions. Traditional machine learning includes classification models, data mining, Bayesian networks, Markov models, clustering, and visual data mapping.

Deep learning differs from traditional machine learning since it uses multiple stages of data processing through many hidden layers of a neural network to learn and interpret the features and the relationships between the features. Deep learning embodies neural networks which differs from the traditional machine learning techniques that do not use neural networks. A neural transformer model with attention is one type of deep learning model that utilizes an attention mechanism. Attention directs the neural network to focus on a subset of features or tokens in an input sequence thereby learning different representations from the different positions of the tokens in an input sequence. The neural transformer model handles dependencies between its input and output with attention and without using recurrent neural networks (RNN) (e.g., long short-term memory (LSTM) network) and convolutional neural networks (CNN).

It should be noted that the term neural transformer model and neural transformer with attention model are used interchangeably. It should also be noted that the aspects disclosed herein are described with respect to neural transformer with attention models. However, the techniques are not limited to these types of neural networks and can be applied to other types of deep learning models that utilize a neural network with a fixed-size context window.

There are various configurations of a neural transformer model with each configuration suited for a particular software engineering task. The decoder-only neural transformer model is an auto-regressive model that produces an output one element at a time based on the outputs of previous time steps. Code generation is best suited for a decoder neural transformer model since it is an auto-regressive task that predicts an ordered sequence of tokens where the order depends on the preceding tokens in the sequence. The decoder uses a masked self-head attention which is best suited for auto-regressive tasks since it is explicitly trained to generate auto-regressively.

Figure 2:
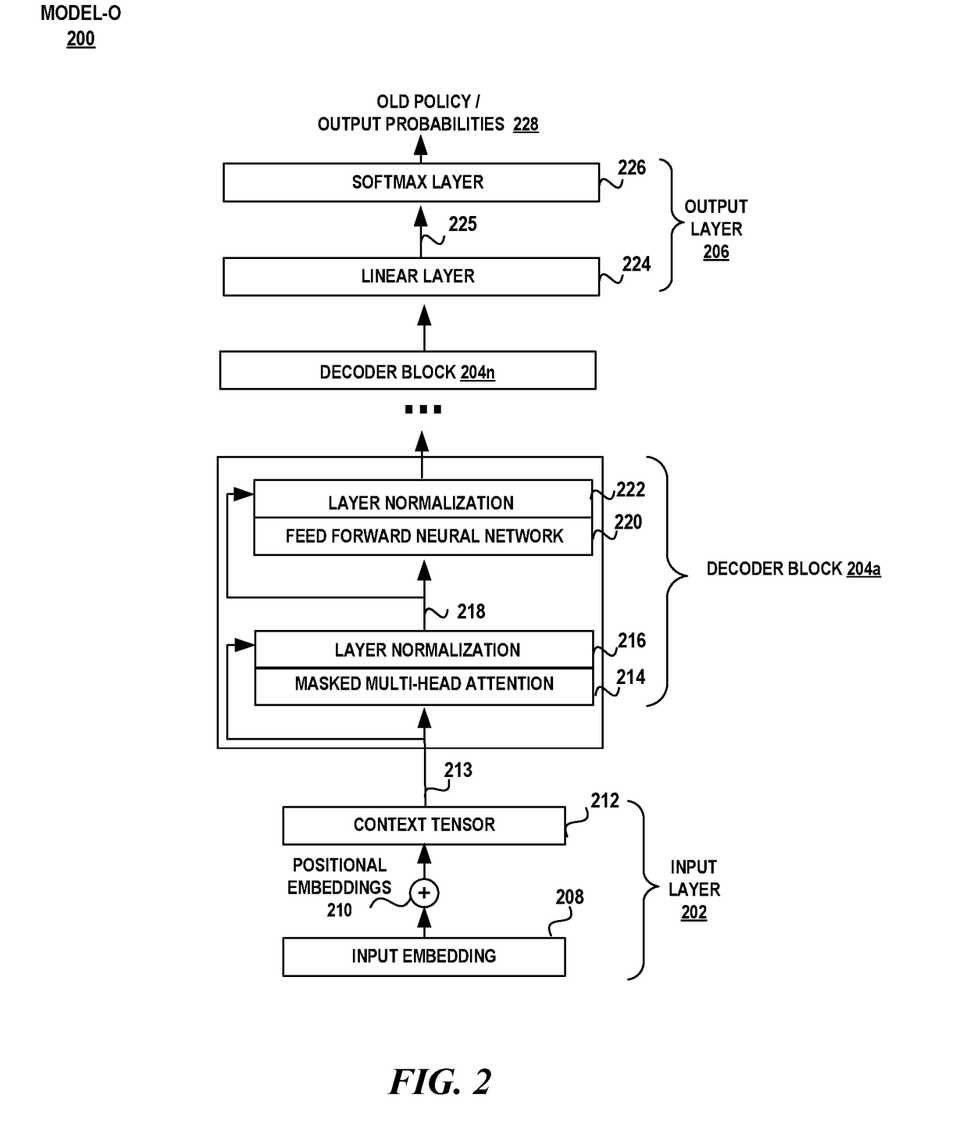
FIG. 2 is a schematic diagram illustrating an exemplary architecture of a decoder-only neural transformer model as the pre-trained deep learning model.

Turning to FIG. 2, there is shown an exemplary configuration of Model-O, a decoder neural transformer model with attention 200 that is trained to generate a unit test case given an input. A decoder neural transformer model 200 includes an input layer 202, one or more decoder blocks 204a-204n ("204"), and an output layer 206. The input or embedding layer 202 generates a context tensor 212 that is the sum of the subtoken embeddings 208 and positional embeddings 210 of an input sequence.

A decoder block 204 consists of two layers. The first layer includes a masked self-attention component 214 followed by a layer normalization component 216. The input to the masked multi-head self-attention component 213 has a residual connection to layer normalization 216. The output of layer normalization 218 is input into the feed forward neural network 220 with a residual connection to layer normalization component 222. The output of the feed forward neural network is input into layer normalization component 222.

The masked multi-head attention component 214 takes a context tensor 212 and weighs the relevance of each subtoken represented in the context tensor 212 to each other by generating attention weights for each subtoken in the context tensor 212. In one aspect, the attention function is scaled dot-product attention which is described mathematically as follows:

$$\text{Attention}(Q, K, V) = \text{softmax}\left(\frac{QK^T}{\sqrt{d_k}}\right)V,$$

where the input consists of queries Q and keys K of dimension $d_k$, and values V of dimension $d_v$. Q is a matrix that contains the query or vector representation of one subtoken in a sequence, K is the vector representations of all subtokens in the sequence, and V is the vector representations of all the subtokens in the sequence.

The queries, keys and values are linearly projected h times in parallel with $d_v$ output values which are concatenated to a final value:

MultiHead (Q, K, V)=Concat(head$_1$, . . . , head$_h$) W$^o$,
where head$_i$=Attention(QW$_i^Q$, KW$_i^K$, VW$_i^V$),
with parameter matrices W$_i^Q \in \mathbb{R}^{d_{model} \times d_k}$, W$_i^K \in \mathbb{R}^{d_{model} \times d_k}$, W$_i^V \in \mathbb{R}^{d_{model} \times d_k}$, and W$^O \in \mathbb{R}^{hd_v \times d_{model}}$, where W$_i^Q$ are the query weights, W$_i^K$ are the key weights, W$_i^V$ are the value weights, and W$^O$ are the weights of the concatenated output. Hence, the weights of the masked multi-head attention layer 214 are the parameter matrices, $W_i^Q$, $W_i^K$, $W_i^V$, $W^O$.

Each token/subtoken flows through all the decoder blocks along its own path. The masked self-attention component 214 allows the feed forward neural network 220 to focus on certain features or inputs. The decoder block 204 predicts each token/subtoken $t_i$ in the target language one-by-one at each time step conditioned on all previously-generated target tokens/subtokens $t_1, \ldots t_{i-1}$.

The masked self-attention component 214 masks the output embeddings from future time steps. The feed-forward neural network 220 processes each output embedding separately. A layer normalization component 216, 222 is used between the layers in order to normalize the inputs across the features.

The output layer 206 includes a linear layer 224 and a softmax layer 226. The linear layer 224 projects the vector produced by the stack of decoders into a logits vector 225. The softmax layer 22 then turns the scores of the logits vector 225 into output probabilities for each token in the model's vocabulary 228 which are positive and normalized.

Figure 3:
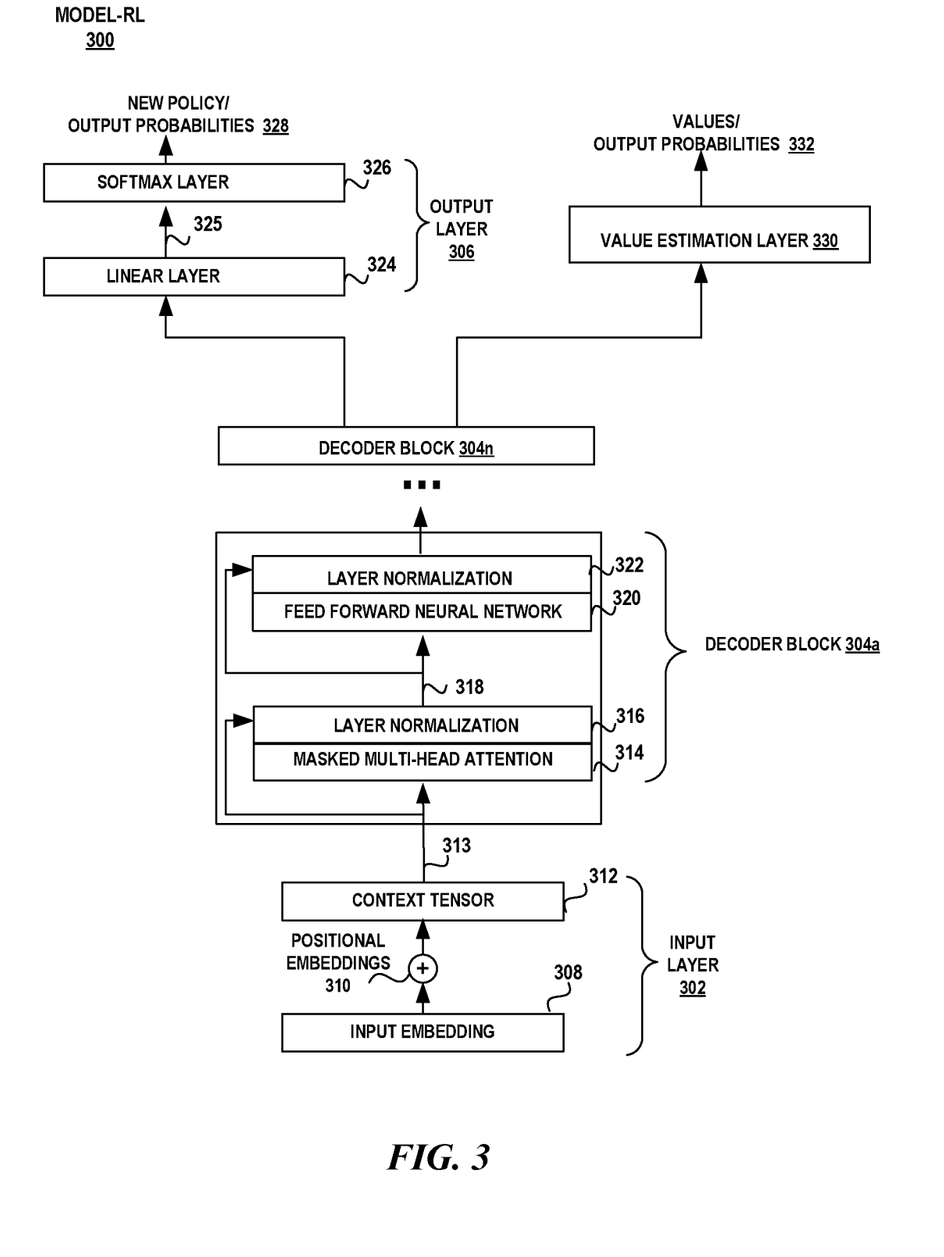
FIG. 3 is a schematic diagram illustrating an exemplary configuration of a decoder-only neural transformer model as the reinforcement-learning tuned deep learning model.

Turning to FIG. 3, there is shown an exemplary configuration of the optimized model, Model-RL, which is a decoder neural transformer model with attention 300. The configuration of Model-RL is similar to the configuration of Model-O except that Model-RL has an additional output layer.

The decoder neural transformer model 300 includes an input layer 302, one or more decoder blocks 304a-304n ("304"), output layer 306 and output layer 328. The input or embedding layer 302 generates a context tensor 312 that is the sum of the subtoken embeddings 308 and positional embeddings 310 of an input sequence.

A decoder block 304 consists of two layers. The first layer includes a masked self-attention component 314 followed by a layer normalization component 316. The input to the masked multi-head self-attention component 313 has a residual connection to layer normalization 316. The output of layer normalization 318 is input into the feed forward neural network 320 with a residual connection to layer normalization component 322. The output of the feed forward neural network is input into layer normalization component 322.

Each token/subtoken flows through all the decoder blocks along its own path. The masked self-attention component 314 allows the feed forward neural network 320 to focus on certain features or inputs. The decoder block 304 predicts each token/subtoken $t_i$ in the target language one-by-one at each time step conditioned on all previously-generated target tokens/subtokens $t_1, \ldots t_{i-1}$.

The masked self-attention component 314 masks the output embeddings from future time steps. The feed-forward neural network 320 processes each output embedding separately. A layer normalization component 316, 322 is used between the layers in order to normalize the inputs across the features.

Output layer 306 generates an output distribution of the new policy 328. Output layer 306 includes a linear layer 324 and a softmax layer 326. The linear layer 324 projects the vector produced by the last decoder block of hidden states into a logits vector 325. The softmax layer 322 then turns the scores of the logits vector 325 into output probabilities for each token in the model's vocabulary 328 which are positive and normalized.

The value estimation layer 330 computes an additional scalar value output for each token $v_t$. Value estimation layer 330 is composed of a linear feed-forward neural network layer with a hyperbolic tangent activation layer. The output of the value estimation layer 330 is a vector of action values $v_t$ that are input into the PPO engine for the computation of the policy loss.

It should be noted that during tuning, the parameters of each decoder block and output layers 306 and 330 are updated based on the policy loss as well as the parameters of the value estimation layer. The parameters of the value estimation layer are updated, in order to improve the model's estimation of the reward value of its own predictions, propagating the value error using stochastic gradient descent. Stochastic gradient descent operates using the overall loss over the entire model.

Parameter Updating

The training of a neural transformer model is a process where the model learns which weights and biases (i.e., parameters) minimize a cost function which results in a better fitting model. The weights and biases are used in various layers of the decoder blocks as explained in further detail below.

Referring to FIG. 3, the input 302 generates an input sequence of embeddings 308 that are applied to the pre-trained model. Given an input sequence of tokens X, the input layer 308 converts the input sequence into an embedding input tensor $H^0 \in \mathcal{R}^{|X| \times d_h}$, where $|X|$ is the input sequence length and $d_h$ is the embedding dimension. Each row j of $H^0$ is obtained is obtained as $H^0_j = \text{EmbeddingLookup}_{token}(x_j, V) + \text{EmbeddingLookup}_{position}(j, P)$, where $\text{EmbeddingLookup}_{token}$ is performed to search in an embedding store for the embedding of subtoken $x_j$, where $\text{EmbeddingLookup}_{position}$ is performed to search in the embedding store for the embedding of position j, where V is the subtoken vocabulary, $x_j$ is a subtoken at position j of the input sequence, and P is the maximum sequence length or the maximum number of positions in a sequence. $\text{EmbeddingLookup}_{token}(x_j, V)$ returns the dimensional row, $d_h$, of the embedding matrix Ws that corresponds to $x_j$ and $\text{EmbeddingLookup}_{position}(j, P)$ returns the dimensional row of the embedding matrix Wp that corresponds to the position j.

The model 300 applies N decoder blocks over the input embeddings to produce contextual representations: $H^n = \text{decoder}_n(H^{n-1})$, $n \in [1, N]$.

Each decoder block 304 includes a multi-headed self-attention layer 314 followed by a feed forward neural network layer 320. Each of these layers is followed by skip-connection and layer normalization operation, 316, 322. Specifically, for the n-th decoder block:

$G^n = \text{LayerNorm}(\text{MultiHeadAttn}(H^{n-1}) + H^{n-1}$ $H^n = \text{LayerNorm}(\text{FeedForward}(G^n) + G^n)$ where MultHeadAttn is operation of the multi-head self-attention layers 314 and FeedForward is the operation of the feed forward neural network layers 320 and LayerNorm is the operation of the layer normalization layers 316, 322.

For the n-th decoder layer, the multi-headed self-attention is parameterized with matrices $W_i^Q$, $W_i^K$, $W_i^V \in \mathbb{R}^{d_h \times d_k}$, which are used to linearly project the $H^{n-1}$ to obtain query, key and value matrices:

$Q_i = H^{n-1} * W_i^Q$, $K_i = H^{n-1} * W_i^K$, $V_i = H^{n-1} * W_i^V$.

The output of the multi-head attention operation is obtained as:

$$\left(\frac{Q_i K_i^T}{\sqrt{d_K}} + M\right) V_i,$$

where the previous layer's output $H^{n-1} \in \mathcal{R}^{|X| \times dh}$ is linearly projected to a triplet of queries, keys, and values using model parameters $W_i^Q, W_i^K, W_i^V \in R^{dh \times dk}$, respectively, where u is the number of self-attention heads, $d_k$ is the dimension of a head, and $W_n^O \in \mathcal{R}^{dh \times dh}$ are the model parameters, where $M \in \mathcal{R}^{dh \times dh}$ is a mask matrix, where [ . . . ] represents a concatenation operation.

$G^n$ serves as input to a feed-forward neural network 320 which includes a GELU activation layer. The feed-forward neural network 320 performs the computation $Z^n = W_2^T$ GELU $(W_1^T + b_1) + b_2$, where $W_1 \in \mathcal{R}^{dh \times dh}, W_2 \in \mathcal{R}^{4dh \times dh}$ are weight matrices parametrizing the feed-forward neural network.

The output of the feed-forward neural network layer 320 is obtained by applying the skip-connection and layer normalization operation:

$H^n$ = LayerNorm $(Z^n + G^n)$, where the LayerNorm function is defined as:

$$(Z^n, \gamma, \beta) = \gamma \frac{Z^n - u_{Z^n}}{\sigma_{Z_n}} + \beta,$$

where $\gamma, \beta \in \mathcal{R}^d$, and where $$\mu_{Z^n} = \frac{1}{k} \sum_{i=1}^{k} Z_i^n,$$

and where $$\sigma_{Z^n} = \sqrt{\frac{1}{k} \sum_{i=1}^{k} (Z_i^n - \mu_{Z^n})^2}.$$

The tuning of the feed forward neural network 214, 230, consists of the forward pass, loss calculation $\mathcal{T}$, backward pass to extract the gradient of the loss function $\nabla \mathcal{T}$ over the trainable parameters via chain-rule differentiation and the weight update. The weight update is performed using the standard stochastic gradient descent formulation:

$W^k = W^{k-1} - \lambda \nabla \mathcal{T}(W^{k-1})$.

Methods

Attention now turns to description of the various exemplary methods that utilize the system and device disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 4:
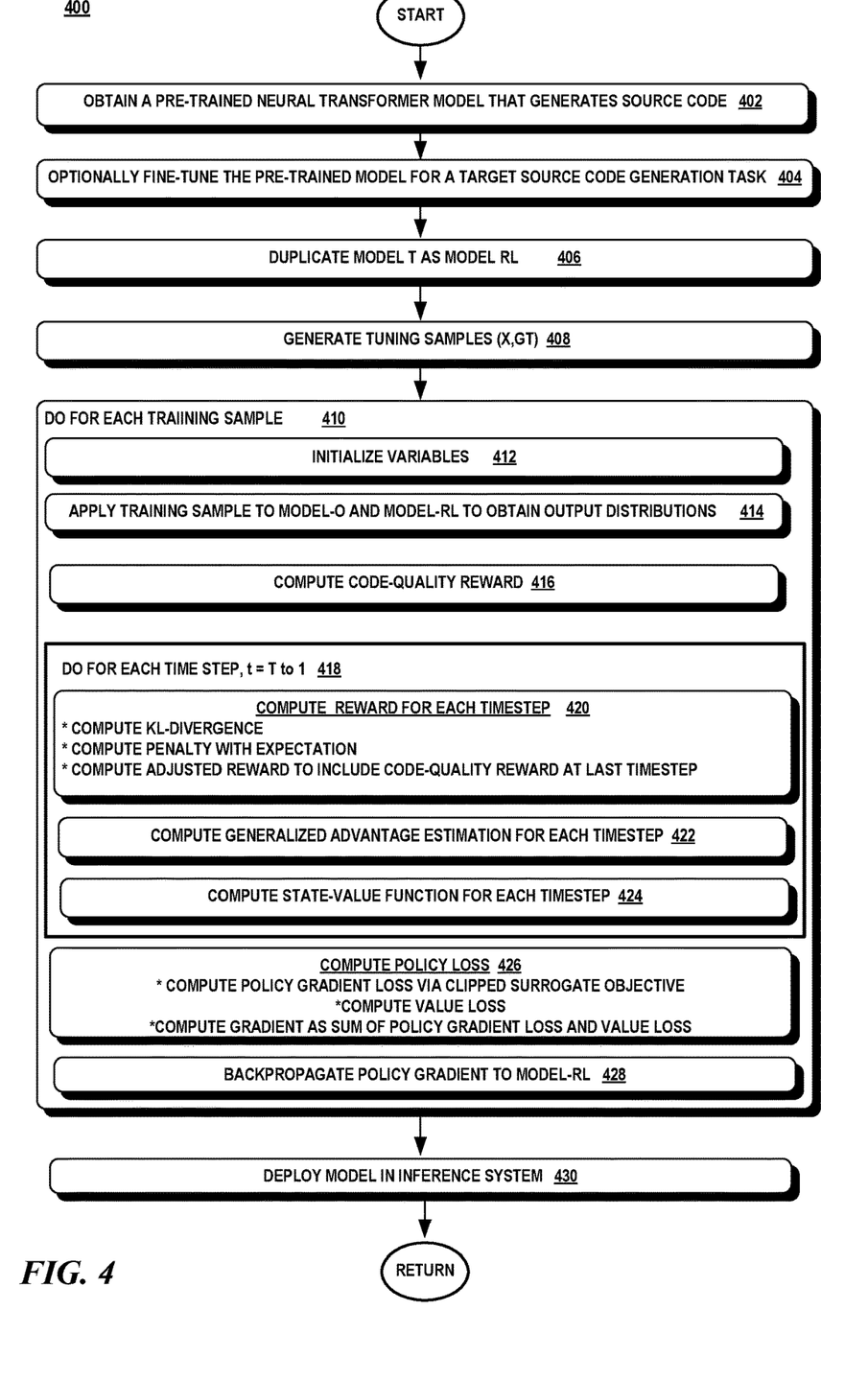
FIG. 4 is a flow diagram illustrating an exemplary method for tuning a pre-trained deep learning model through reinforcement learning using code-quality rewards.

The method 400 alternates between sampling data using the old policy and the new policy (blocks 410-424) and optimizing the new policy (block 426) based on the sampled data. Sampling the data includes applying a tuning sample to both Model-O and Model-RT, analyzing the two output distributions, generating a reward score for each action at each time step, and computing a corresponding state-value and an action-value. Optimizing the new policy includes determining a policy loss based on the sampled data and backpropagating the policy loss to the layers of the decoder blocks.

The goal of the policy loss is to optimize the expected total reward. Since there is a long-time delay from when the model predicts an action and knows the effect of that action on the reward, a generalized advantage function estimation is computed which estimates the goodness of the action before the delayed reward is known. The generalized advantage function estimation yields the lowest possible variance that the policy gradient applies to the model.

The generalized advantage estimation is based on a state-value function and an action-value function. A value is the total amount of rewards until reaching a terminal state. A state-value function returns a value of achieving a certain state and an action-value returns the value of choosing an action in a state. The value estimation layer of Model-RL generates the values for the action-value function.

Turning to FIG. 4, there is shown an exemplary method 400 for tuning a deep learning model to generate source code for a particular task through proximal policy optimization using an adjusted reward score that includes a code-quality reward. The method 400 operates by sampling the output of both models over a tuning dataset (blocks 414-424) and optimizing a surrogate objective (block 426) using stochastic gradient descent (block 428).

It should be noted that the method is shown with one policy gradient update for each data sample over T timesteps. However, it should be understood that the sampling may be performed for several samples in a batch with the policy gradient update performed once for each batch.

If a pre-trained deep learning model is not available for the target code generation task, one is generated by training a model with an unsupervised set of source code snippets written in a single programming language to learn to predict or generate source code given a context or input. The pre-trained model can be described as a language model which defines a probability distribution p over n sequences of tokens $x_0 \ldots x_{n-1}$ as the conditional probability $p(_0 \ldots x_{n-1}) = \Pi_{0 \leq k < n} p(x_0 \ldots x_{k-1})$. (Collectively, block 402).

In one aspect, the pre-trained model may optionally be fine-tuned for a target task. For example, the target task may be unit test case generation given a focal method body. A supervised training dataset may be applied to the model which contains sample pairs, where a sample pair includes a focal method body and its corresponding ground truth unit test case. (Collectively, block 404).

The pre-trained model or the fine-tuned model is then duplicated into a second model, Model-RL, having the same trained parameters of Model-O. The initial model parameters are then tuned through proximal policy optimization to learn to predict source code for the target task. (Collectively, block 406).

A tuning dataset of sample pairs is obtained to optimize Model-RL. In the scenario where a unit test case is generated, the sample pairs include a focal method x and its ground truth unit test case, gt. (Collectively, block 408).

The variables used in the calculation of the loss are initialized at the start of each training iteration (blocks 410, 412). In one aspect, these variables are initialized as follows: KL penalty coefficient $\beta = 0.2$; target KL value for adaptive KL control, $KL_{target} = 6.0$; and parameters for the generalized advantage function: $\gamma = 1.0$ and $\lambda = 0.95$ (block 412).

For each training sample (block 410), the focal method x is applied to both Model-O and to Model-RL (block 414). The focal method x is transformed into an ordered sequence of tokens, tokenized, and then converted into a subtoken embedding and related positional embedding. The subtoken embedding and related positional embedding is concatenated into a context tensor. The context tensor is input into both the Model-O and the Model-RT neural transformer model and passed through the multiple layers of each decoder block of each neural transformer model.

Each model is autoregressively predicting one token at each time step t to follow the previously predicted tokens in a predicted sequence y. Initially, each model receives a sequence of tokens $token_0, \ldots, token_{T-1}$ and at each timestep. The tokens in the output sequence are then shifted to the left and input back into the first decoder block. The number of timesteps t in this scenario is the number of tokens in a sequence or the sequence length T. (Collectively, block 414).

The PPO engine stores the output distribution of Model-O, $\pi$, from the last timestep T and the policy output at each timestep $p_t$ and the action-value $v_t$ from each timestep t, where $t=1 \ldots T$ (block 414).

When the time step is the last time step T, a complete source code snippet is predicted which is then analyzed for its viability in the target task using the code-quality factors and source code metrics (block 416). In one aspect, the code specific reward, R(x, y, gt) is computed as follows:

$$R(x,y,gt)=\alpha \cdot u(y)+\beta \cdot c(y)+\gamma \cdot s(y,gt), \quad (1)$$

where $\alpha$, $\beta$, $\gamma$ are tunable parameters that give more weight to a particular code-quality factor, x is the given focal method, y is the predicted unit test case, and gt is the ground truth test case (block 416).

In another aspect, the ground truth test case is not required, allowing to train the model in a completely unsupervised fashion. In this case, when only unsupervised code-quality factors are used, the code-quality reward becomes $$R(x,y)=\alpha \cdot u(y)+\beta \cdot c(y). \quad (2)$$

The code-quality reward includes code-quality factors and source code metrics. The code-quality factors include unsupervised binary properties and unsupervised continuous properties. The source code metrics include BLEU and ROUGE scores. (Collectively, block 416).

A source code property is a factor of the viability or usefulness of the predicted source code snippet for its intended task. Each source code property is either true or false. These properties are unsupervised since they do not rely on the ground truth source code. The binary source code properties include syntax, invocation, build, and execution. The syntax property is true if the predicted source code snippet is syntactically correct. The invocation property is true if the predicted source code snippet is capable of invoking the focal method x. The build property is true if the predicted source code snippet successfully compiles and the execution property is true if the predicted source code snippet successfully executes. (Collectively, block 416).

The unsupervised continuous properties include readability, functional correctness or coverage. Readability accounts for non-functional qualities of the predicted source code snippet such as the readability of variable names, adherence to coding best practices, and comments. The readability score can be computed in different ways, according to the organization's standard and preferences. In one aspect, the readability score can be computed as the ratio of variable names within the predicted code, that are composed of words that can be found in an English vocabulary. The intuition behind this ratio is that the more variable names are common words, the more understandable is the meaning and function of the variable. Functional correctness aims at computing the degree of correctness of a generated method body. It is computed as the ratio of the passing test cases, over all the existing test cases in the test suite. The intuition is that a predicted method which passes more tests is a better candidate than a predicted method with more failed test cases. If the predicted output is a test case, the test coverage is computed instead of the functional correctness. The coverage property accounts for statement and branch coverage obtained by the predicted source code snippet on the focal method. It is computed as the ratio of covered statement and branches within the focal method. (Collectively, block 416).

The supervised metrics are computed considering the ground truth code gt. The metrics are computed for a predicted source code snippet y and its ground truth code gt. In one aspect, the BLEU (BiLingual Evaluation Understudy) and the Recall-Oriented Understudy for Gisting Evaluation (ROUGE) metrics are used. (Collectively, block 416).

BLEU is a metric for automatically evaluating machine-predicted output. The BLEU score is a number between zero and one that measures the similarity of the predicted source code snippet to its ground truth code. A value of 0 means that the machine-predicted output has no overlap with ground truth code (low quality) and a value of 1 means there is perfect overlap with the ground truth code (high quality). (Collectively, block 416).

ROUGE is another metric for automatically evaluating machine-predicted output. ROUGE contains five different metrics which analyze the overlap of the tokens in the predicted output and the ground truth code, analyzes the code line similarity between the two codes, analyzes the code for co-occurrences of tokens, and analyzes the similarity between the longest common sequence. (Collectively, block 416).

Next, the reward is computed for each timestep t starting from the last time step T to the first-time step, $t=T \ldots 1$. The reward for each timestep is based on the KL divergence between the old policy and the new policy. The code-quality reward is added to the reward of the last timestep T.

For each timestep t, starting from the last time step T to the first-time step (block 418), the reward $r_t$ for the time step is computed (block 420). The reward function $r_t$ is represented mathematically as follows:

$$r_t = -\beta_t \log \frac{\pi(y|x)}{\rho(y|x)}, \text{ for time step } t < T, \quad (3)$$

$$r_t = R(x, y, gt) - -\beta_t \log \frac{\pi(y|x)}{\rho(y|x)}, \text{ for time step } t = T, \quad (4)$$

where $$\log \frac{\pi(y|x)}{\rho(y|x)}$$

is the ratio of the old policy $\pi$ over the new policy p computed as the KL divergence between the two policies, where $\beta_t$ is a $$\text{penalty} = \beta_{t-1}(1 + K_\beta e_t),$$

where $$e_t = \left( \frac{KL(\pi t, \rho) - KL\ \text{target}}{KL\ \text{target}}, -0.2, 0.2 \right),$$

with $K_\beta = 0.1$ and $KL_{target} = 6$, where x is the focal method, y is the predicted test case output by a model, gt is the ground truth, and where R (x, y, gt) is the code-quality reward.

Each model outputs a policy or output distribution. Model-O outputs policy $\pi(y|x)$ at time step t and Model-RL outputs policy $\rho(y|x)$ at time step t. When the time step is not the last time step T, the reward is computed as in equation (3). The ratio of the old policy over the new policy log $$\frac{\pi(y|x)}{\rho(y|x)}$$

quantifies the difference between the two probability distributions. The ratio represents the Kullback-Leibler (KL) divergence of the two probability distributions. The penalty $\beta_t$ is used to prevent the new policy $\rho$ from diverging too far from the old policy $\pi$. (Collectively, block 420).

When the time step is the last, the reward is computed as in equation (4) above (block 420).

Next, an estimator of the generalized advantage function at each time step t is computed, $\hat{A}_t$. The generalized advantage estimation at time step, t, is computed as using the reward at time t and the value function, $v_t$, output from Model-RL. The generalized advantage estimation at time step t is represented mathematically as follows:

$$\hat{A}_t = \delta + \gamma \cdot \lambda \cdot \hat{A}_{t+1},$$

where $\delta = r_t + \gamma \cdot v_{t+1} - v_t$, where $\gamma$, $\lambda$ are hyper-parameters which can be manually set to obtain different reinforcement learning models. The parameters' range is: $\gamma \in [0,1]$, $\lambda \in [0,1]$. Specifically, the parameter y is known as the discount factor, used to reduce the value of future tokens, and emphasize the value of the current sequences of tokens. This can be tuned to obtain shorter or longer sentences. Instead, $\lambda$ is a smoothing parameter used for reducing the variance in training. (Collectively, block 422).

Next the state-value function is estimated (block 424). The state-value function of a state-action pair is an estimate of how good the model performs given an action in a given state. The state-value function at timestep t is computed as $V_t^{targ} = \hat{A}_t + v_t$. (Collectively, block 424).

Upon completion of the analysis of the sampled data at each temporal or time step, the policy loss is computed (block 426). The policy loss is computed as the sum of the clipped surrogate objective function and the value estimate error loss.

The policy loss computation is represented mathematically as follows:

$L = L_{CLIP} L_{VF}$, where $L_{CLIP}$ is the policy gradient loss via the clipped surrogate objective, $L_{VF}$ is the computed squared error loss of the value estimates, $$L_{VF} = \Sigma_{t=1}^{Num\_tokens} (v_t - V_t^{targ})^2,$$

$$L_{CLIP} = \Sigma_{t=1}^{Num\_tokens} \min(r_t\ \hat{A}_t,\ \text{clip}\ (r_t, -0.2, 0.2),\ 1-\epsilon, 1+\epsilon) \cdot \hat{A}_t.$$

Once the policy loss L is calculated, the policy loss is propagated backwards to each layer of each decoder block that contributed directly to the output. In backpropagation, the partial derivatives of the policy gradient with respect to the trainable parameters are determined. The weight gradients for the parameters are calculated as the difference between the old values and the new values of the weights. The weights are adjusted to make the loss as small as possible using a stochastic gradient descent technique. (Collectively, block 428).

Upon completion of the optimization of Model-RL, Model-RL is then deployed in an inference system. In one aspect, the model may be deployed in a web service or application that generates test cases given an input, such as a method signature or a method body. In another aspect, the model may be part of a source code editor or integrated development environment ("IDE") that generates unit test cases automatically upon initiation of a particular user input. In another aspect, the model may be part of an application that generates unit test cases for source code uploaded into a source code repository. (Collectively, block 430).

Exemplary Operating Environment

Figure 5:
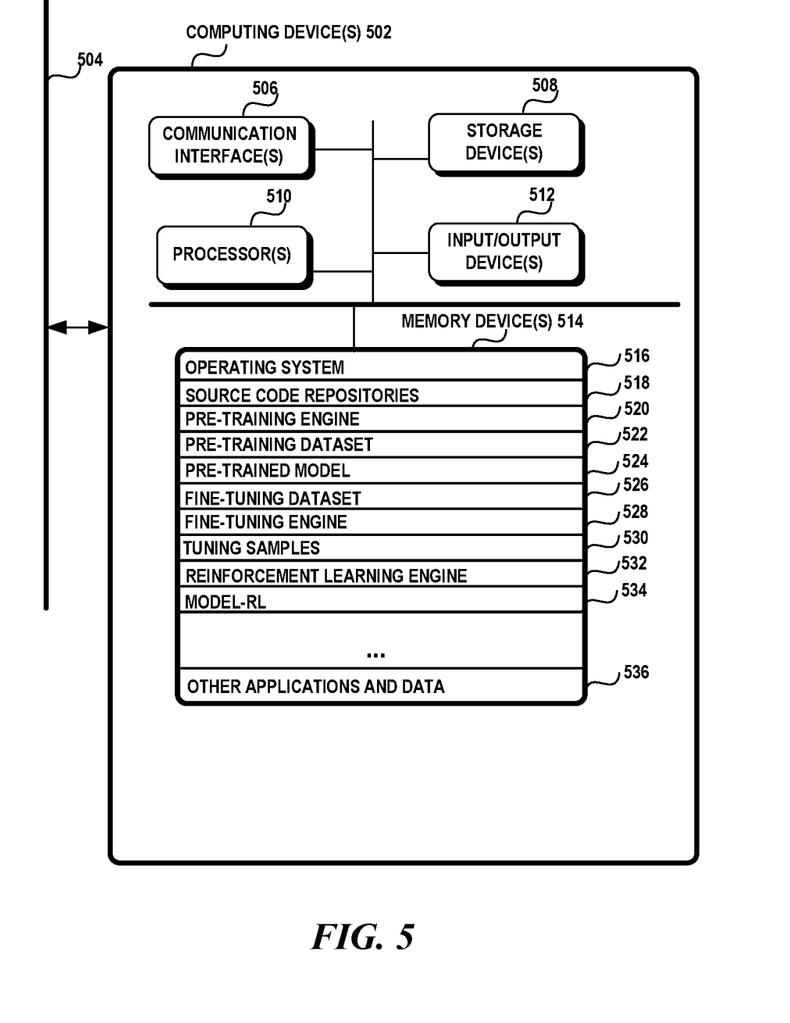
FIG. 5 is a block diagram illustrating an operating environment.

Attention now turns to a discussion of an exemplary operating environment. FIG. 5 illustrates an exemplary operating environment 500 in which one or more computing devices 502 are used in the tuning of a code generation model through reinforcement learning using code-quality reward. In one aspect, the tuning of the deep learning model and the usage of the model in an inference system may be performed on a single device.

In alternate embodiments, the training system may be configured as a cloud service that trains and/or operates the model as a service. A client device may transmit to the cloud service the training samples and the cloud service may tuned the model. The interaction between the client device and the cloud service may be performed through various APIs. The tuned model may then be operated either on the client device or in the cloud service.

Alternatively, the client device may include a source code editor or IDE using the tuned model as an add-on, extension, or plug-in to generate source code as the developer is developing source code in the source editor or IDE. Other variations are possible and it should be noted that the operating environment is not limited to any particular configuration.

The computing devices 502 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 500 may be configured in a network environment, a distributed environment, a multi-processor environment, or a stand-alone computing device having access to remote or local storage devices.

The computing devices 502 may include one or more processors 510, one or more communication interfaces 506, one or more storage devices 508, one or more input/output devices 512, and one or more memory devices 514. A processor 510 may be any commercially available or customized processor and may include dual microprocessors and multi-processor architectures. A communication interface 506 facilitates wired or wireless communications between the computing device 502 and other devices. A storage device 508 may be computer-readable medium that does not contain propagating signals, such as modulated data signals transmitted through a carrier wave. Examples of a storage device 508 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 508 in the computing devices 502. The input/output devices 512 may include a keyboard, mouse, pen, voice input device, touch input device, display, speakers, printers, etc., and any combination thereof.

A memory device or memory 514 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory device 514 may also include one or more external storage devices or remotely located storage devices that do not pertain to propagated signals, such as modulated data signals transmitted through a carrier wave.

The memory device 514 may contain instructions, components, and data. A component is a software program that performs a specific function and is otherwise known as a module, program, component, and/or application. The memory device 514 may include an operating system 516, one or more source code repositories 518, a pre-training engine 520, a pre-training dataset 522, a pre-trained model 524, a fine-tuning dataset 526, a fine-tuning engine 528, tuning samples 530, reinforcement learning engine 532, a model optimized through reinforcement learning, Model-RL, 534, and other applications and data 536.

The computing devices 502 may be communicatively coupled via a network 504. The network 504 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

The network 504 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra-Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

Technical Effect

Aspects of the subject matter disclosed herein pertain to the technical problem of providing efficient runtime performance of a deep learning model on a computing device for a target source code generation task. The technical features associated with addressing this problem is the tuning of the model to more accurately predict quality source code for the target source code generation task using a reinforcement learning technique that optimizes the parameters of the model based on a reward score that rewards quality-generated source code. The reward score uses source code-quality factors and metrics that award a higher reward to source code predicted from the model that is compilable, executable, invocable, readable, etc. over source code that is only syntactically correct. In this manner, when the model operates on a computing device during inference, it will consume less resources and time to predict source code for an intended task.

Conclusion

It may be appreciated that the representative methods described herein do not necessarily have to be executed in the order presented, or in any particular order, unless otherwise indicated. Moreover, various activities described with respect to the methods can be executed in serial or parallel fashion, or any combination of serial and parallel operations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A system is disclosed, comprising: one or more processors; and a memory that stores one or more programs that are configured to be executed by the one or more processors, the one or more programs include instructions to perform actions that: obtain a deep learning model previously trained to generate source code for a first source code task, wherein parameters of the deep learning model are learned through cross-entropy loss; tune the parameters of the deep learning model to learn to generate source code for a second source code task, wherein the parameters of the deep learning model are tuned through reinforcement learning using a reward having a code-quality reward score; and deploy the tuned deep learning model in an inference system to generate source code for the target source code task.

In an aspect, the code-quality reward score includes a syntax correctness score, an invocation score, a compilation score and an execution score. In an aspect, the code-quality reward score includes a BLEU score and/or ROGUE score computed for source code generated by the deep learning model and a ground truth code. In an aspect, the code-quality reward score includes a readability score, a functional correctness score, and a coverage score for source code generated by the deep learning model. In an aspect, the reinforcement learning includes a policy gradient method based on a clipped surrogate objective function. In an aspect, the policy gradient method includes a value function error term.

In an aspect, the deep learning model includes a neural transformer model with attention.

A computer-implemented method is disclosed, comprising: selecting a pre-trained deep learning model trained to generate source code for a first source code generation task; generating a second deep learning model having parameters of the pre-trained deep learning model; updating the parameters of the second deep learning model to learn to generate source code for a second source code generation task given a plurality of tuning samples, wherein the updating uses a policy gradient method to determine a policy loss, wherein the policy gradient method is based on a reward score having a code-quality reward for each source code snippet generated by the second deep learning model given a select one of the tuning samples, wherein the policy loss is backpropagated to the second deep learning model to update the parameters of the second deep learning model to learn to generate source code for the second source code generation task; and applying the tuned deep learning model in an inference system to generate source code for the second source code generation task.

In an aspect, the computer-implemented method further comprises: generating the code-quality reward to include a syntactic correctness score, a compilation score, an execution score, an invocation score, a readability score, a functional correctness score, and a coverage score. In an aspect, the computed-implemented method further comprises: augmenting the code-quality reward to include at least one source code metric score. In an aspect, the computed-implemented method further comprises: generating the at least one source code metric score from a Bilingual Evaluation Understudy Score (BLEU) score and/or a Recall-Oriented Understudy for Gisting Evaluation (ROGUE) score based on a tuning sample and a corresponding ground truth output.

In an aspect, the computed-implemented method further comprises: applying the pre-trained deep learning model to generate an old policy output distribution given a first tuning sample; applying the second deep learning model to generate a new policy output distribution given the first tuning sample; computing a KL divergence score of the difference between the old policy output distribution and the new policy output distribution; and adding the KL divergence score to the reward score.

In an aspect, the computer-implemented method further comprises: computing the policy loss using a clipped surrogate objective function. In an aspect, the computer-implemented method further comprises: augmenting the clipped surrogate objective function with a mean squared error of a value function. In an aspect, the pre-trained deep learning model is a neural transformer model with attention and the second deep learning model is a neural transformer model with attention.

Another computer-implemented method is disclosed, comprising: accessing a pre-trained deep learning model having a first set of parameters trained to predict source code for a given first input; tuning the deep learning model to predict source code given a second input, wherein the tuning comprises: iteratively sampling output data from the pre-trained deep learning model and the tuned deep learning model upon application of a plurality of tuning samples; for each sampled output data, computing a reward-based loss between each sampled output from the pre-trained deep learning model and each sampled output from the tuned deep learning model; for each source code snippet generated by the tuned deep learning model, augmenting the reward-based loss with a code-quality reward; and updating parameters of the tuned deep learning model at each iteration based on an accumulated reward-based loss; and upon completion of the tuning, deploy the tuned deep learning model in an inference system. In an aspect, the computer-implemented method further comprises: generating the code-quality reward to include a syntactic correctness score, a compilation score, an execution score, an invocation score, a readability score, a functional correctness score, and a coverage score for the generated source code snippet. In an aspect, the computed-implemented method further comprises: augmenting the code-quality reward to include at least one source code metric score. In an aspect, the computed-implemented method further comprises: generating the at least one source code metric score from a Bilingual Evaluation Understudy Score (BLEU) score and/or a Recall-Oriented Understudy for Gisting Evaluation (ROGUE) score based on a tuning sample of the plurality of tuning samples and a corresponding ground truth output. In an aspect, the deep learning Gusting model is a neural transformer model with attention.

What is claimed:

1. A system comprising:
   one or more processors; and
   a memory that stores one or more programs that are configured to be executed by the one or more processors, the one or more programs include instructions to perform actions that:
   obtain a deep learning model previously trained to generate source code for a first source code task, wherein parameters of the deep learning model are learned through cross-entropy loss;
   tune the parameters of the deep learning model to learn to generate source code for a second source code task, wherein the parameters of the deep learning model are tuned through reinforcement learning using a reward, wherein the reward for the source code generated by the deep learning model comprises a code-quality reward score based on a code quality factor and a source code metric of the generated source code; and
   deploy the tuned deep learning model in an inference system to generate source code for the second source code task.

2. The system of claim 1, wherein the code-quality reward score includes a syntax correctness score, an invocation score, a compilation score and an execution score.

3. The system of claim 2, wherein the code-quality reward score includes a Bilingual Evaluation Understudy Score (BLEU) score and/or Recall-Oriented Understudy for Gisting Evaluation (ROGUE) score computed for source code generated by the deep learning model and a ground truth code.

4. The system of claim 2, wherein the code-quality reward score includes a readability score, a functional correctness score, and a coverage score for the predicted source code generated by the deep learning model.

5. The system of claim 1, wherein the reinforcement learning includes a policy gradient method based on a clipped surrogate objective function.

6. The system of claim 5, wherein the policy gradient method includes a value function error term.

7. The system of claim 1, wherein the deep learning model includes a neural transformer model with attention.

8. A computer-implemented method, comprising:
   selecting a pre-trained deep learning model trained to generate source code for a first source code generation task;

generating a second deep learning model having parameters of the pre-trained deep learning model;

updating the parameters of the second deep learning model to learn to generate source code for a second source code generation task given a plurality of tuning samples, wherein the updating uses a policy gradient method to determine a policy loss, wherein the policy gradient method is based on a reward score having a code-quality reward for each source code snippet generated by the second deep learning model given a select one of the plurality of tuning samples, wherein the policy loss is backpropagated to the second deep learning model to update the parameters of the second deep learning model to learn to generate source code for the second source code generation task; and applying the second deep learning model having the updated parameters in an inference system to generate source code for the second source code generation task.

9. The computer-implemented method of claim 8, further comprising:

generating the code-quality reward to include a syntactic correctness score, a compilation score, an execution score, an invocation score, a readability score, a functional correctness score, and a coverage score.

10. The computed-implemented method of claim 9, further comprising:

augmenting the code-quality reward to include at least one source code metric score.

11. The computed-implemented method of claim 10, further comprising:

generating the at least one source code metric score from a Bilingual Evaluation Understudy Score (BLEU) score and/or a Recall-Oriented Understudy for Gisting Evaluation (ROGUE) score based on a tuning sample and a corresponding ground truth output.

12. The computer-implemented method of claim 8, further comprising:

applying the pre-trained deep learning model to generate an old policy output distribution given a first tuning sample;

applying the second deep learning model to generate a new policy output distribution given the first tuning sample;

computing a Kullback-Leibler (KL) divergence score of the difference between the old policy output distribution and the new policy output distribution; and adding the KL divergence score to the reward score.

13. The computer-implemented method of claim 8, further comprising:

computing the policy loss using a clipped surrogate objective function.

14. The computer-implemented method of claim 13, further comprising:

augmenting the clipped surrogate objective function with a mean squared error of a value function.

15. The computer-implemented method of claim 8, wherein the pre-trained deep learning model is a neural transformer model with attention and the second deep learning model is a neural transformer model with attention.

16. A computer-implemented method, comprising:

accessing a pre-trained deep learning model having a first set of parameters trained to predict source code for a given first input;

tuning the deep learning model to predict source code given a second input, wherein the tuning comprises:

iteratively sampling output data from the pre-trained deep learning model and the tuned deep learning model upon application of a plurality of tuning samples;

for each sampled output data, computing a reward-based loss between each sampled output from the pre-trained deep learning model and each sampled output from the tuned deep learning model;

for each source code snippet generated by the tuned deep learning model, augmenting the reward-based loss with a code-quality reward; and updating parameters of the tuned deep learning model at each iteration based on an accumulated reward-based loss; and upon completion of the tuning, deploy the tuned deep learning model in an inference system.

17. The computer-implemented method of claim 16, further comprising:

generating the code-quality reward to include a syntactic correctness score, a compilation score, an execution score, an invocation score, a readability score, a functional correctness score, and a coverage score for the generated source code snippet.

18. The computed-implemented method of claim 17, further comprising:

augmenting the code-quality reward to include at least one source code metric score.

19. The computed-implemented method of claim 18, further comprising:

generating the at least one source code metric score from a Bilingual Evaluation Understudy Score (BLEU) score and/or a Recall-Oriented Understudy for Gisting Evaluation (ROGUE) score based on a tuning sample of the plurality of tuning samples and a corresponding ground truth output.

20. The computer-implemented method of claim 16, wherein the deep learning predict source model is a neural transformer model with attention.

* * * * *